United States Patent
Lewis

[15] 3,677,608
[45] July 18, 1972

[54] ADAPTIVE BRAKING SYSTEM WITH HYDRAULICALLY POWERED MODULATOR

[72] Inventor: Richard L. Lewis, South Bend, Ind.
[73] Assignee: The Bendix Corporation
[22] Filed: June 1, 1970
[21] Appl. No.: 42,398

[52] U.S. Cl. ........................... 303/21 F, 188/181 A, 303/40, 303/63
[51] Int. Cl. .............................................................. B60t 8/02
[58] Field of Search............91/459, 414, 422; 303/21, 61–63, 303/68, 69, 40, 6; 188/181

[56] References Cited

UNITED STATES PATENTS 3,153,559 10/1964 Schaffer ...............................303/21 F
3,414,336 12/1968 Atkin et al............................303/21 F
3,549,210 12/1970 Birge et al. ..........................303/21 F

*Primary Examiner*—Milton Buchler
*Assistant Examiner*—John J. McLaughlin
*Attorney*—William N. Antonis and Plante, Hartz, Smith and Thompson

[57] ABSTRACT

An adaptive braking system for a motor vehicle including a hydraulically actuated brake pressure modulator controlled by solenoid valves which are responsive to signals from wheel deceleration sensors transmitted through a computer. The power piston of the modulator is prevented from separating from the modulating piston by passing the control fluid through a valve positioned in the power piston and held open by contact with the modulating piston.

1 Claim, 2 Drawing Figures

INVENTOR.
RICHARD L. LEWIS

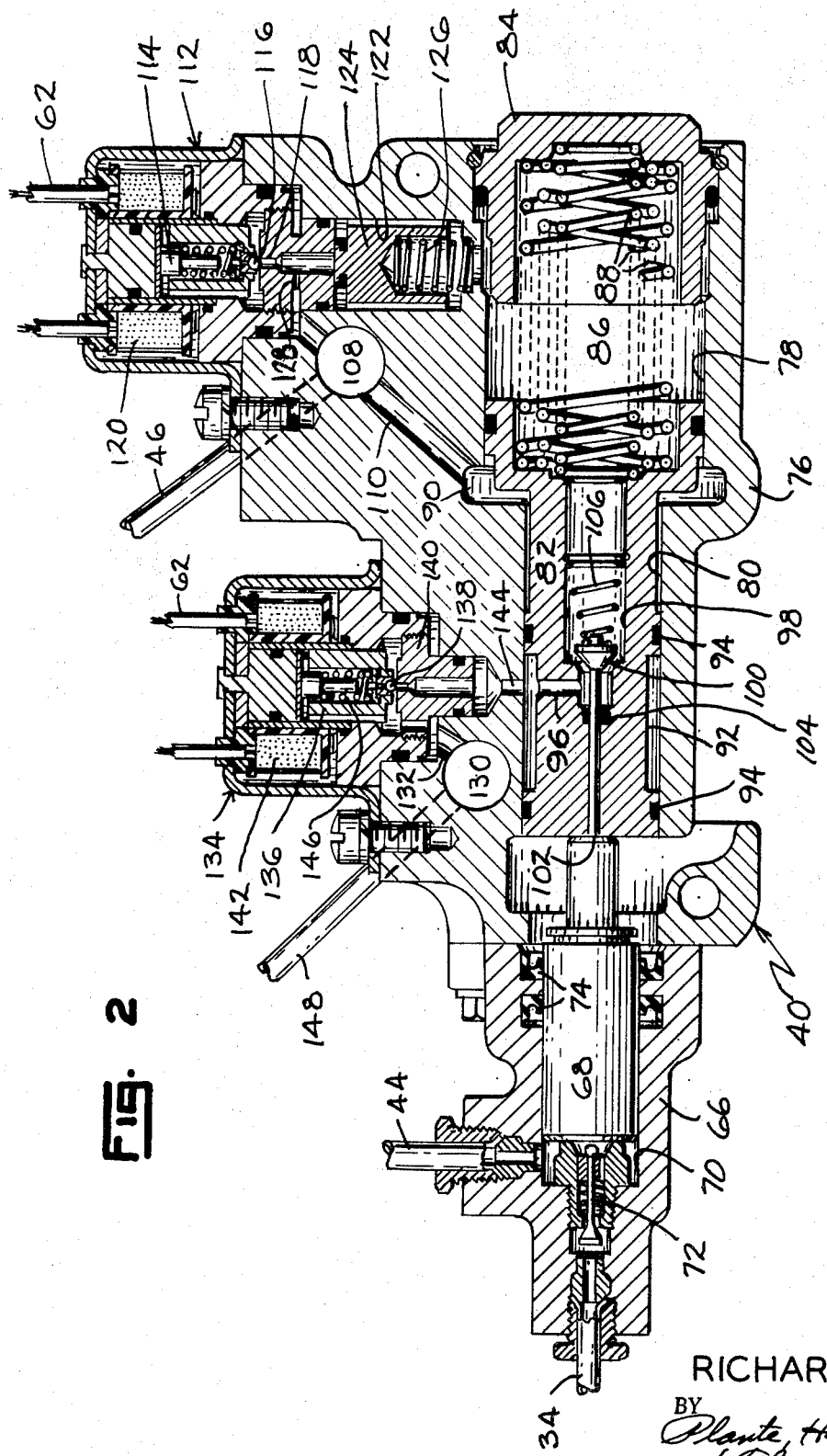

३,६७७,६०८

ADAPTIVE BRAKING SYSTEM WITH HYDRAULICALLY POWERED MODULATOR

SUMMARY OF THE INVENTION

This invention relates to an adaptive braking system for use with a motor vehicle. More specifically, it relates to use on a vehicle equipped with hydraulic booster brakes such as those illustrated in U. S. application Ser. No. 794,472, filed Jan. 15, 1969, now U.S. Pat. No. 3,532,027 having in common with this application the same assignee.

It is an object of this invention to provide an adaptive braking system employing a novel hydraulically actuated brake pressure modulator which is an improvement of that illustrated in U. S. application Ser. No. 831,949, filed June 10, 1969, now U.S. Pat. No. 3,610,702 also having in common with this application the same assignee.

In the development of power operated brake pressure modulators, it has been found necessary to separate the pressure modulating piston from the power piston. This necessity arises from the fact that, when maximum rates of pressure reduction are called for, the power piston may overtravel. If it were positively connected to the modulating piston, the modulating piston might also be forced to overtravel, creating a vacuum in the brake actuating cylinders and drawing air into them. It is well known that the presence of air in brake operating cylinders may render the brakes completely inoperative. While the separation of the pistons overcame this difficulty, on occasion it rendered the function of the adaptive braking system less effective, particularly when the adaptive braking system employed an operation in its cycle called "slow build." In this operation the power piston moves slowly in the pressure increasing direction; however, if it has overtraveled away from the modulating piston, too much time may elapse before it re-engages the modulating piston. Such time delays could result in losses of braking effectiveness instead of the gains expected from the adaptive braking system.

It is an object of this invention to provide an adaptive braking system employing a novel hydraulically actuated brake pressure modulator including novel valve means for preventing the modulating piston from separating from the power piston.

Other objects and features of the invention will be apparent from the following description of the adaptive braking system taken in connection with the accompanying drawings.

BRIEF DESCRIPTION OF THE DRAWINGS

FIG. 2 is a longitudinal sectional view through the hydraulic modulator.

DETAILED DESCRIPTION OF THE INVENTION

Figure 1:
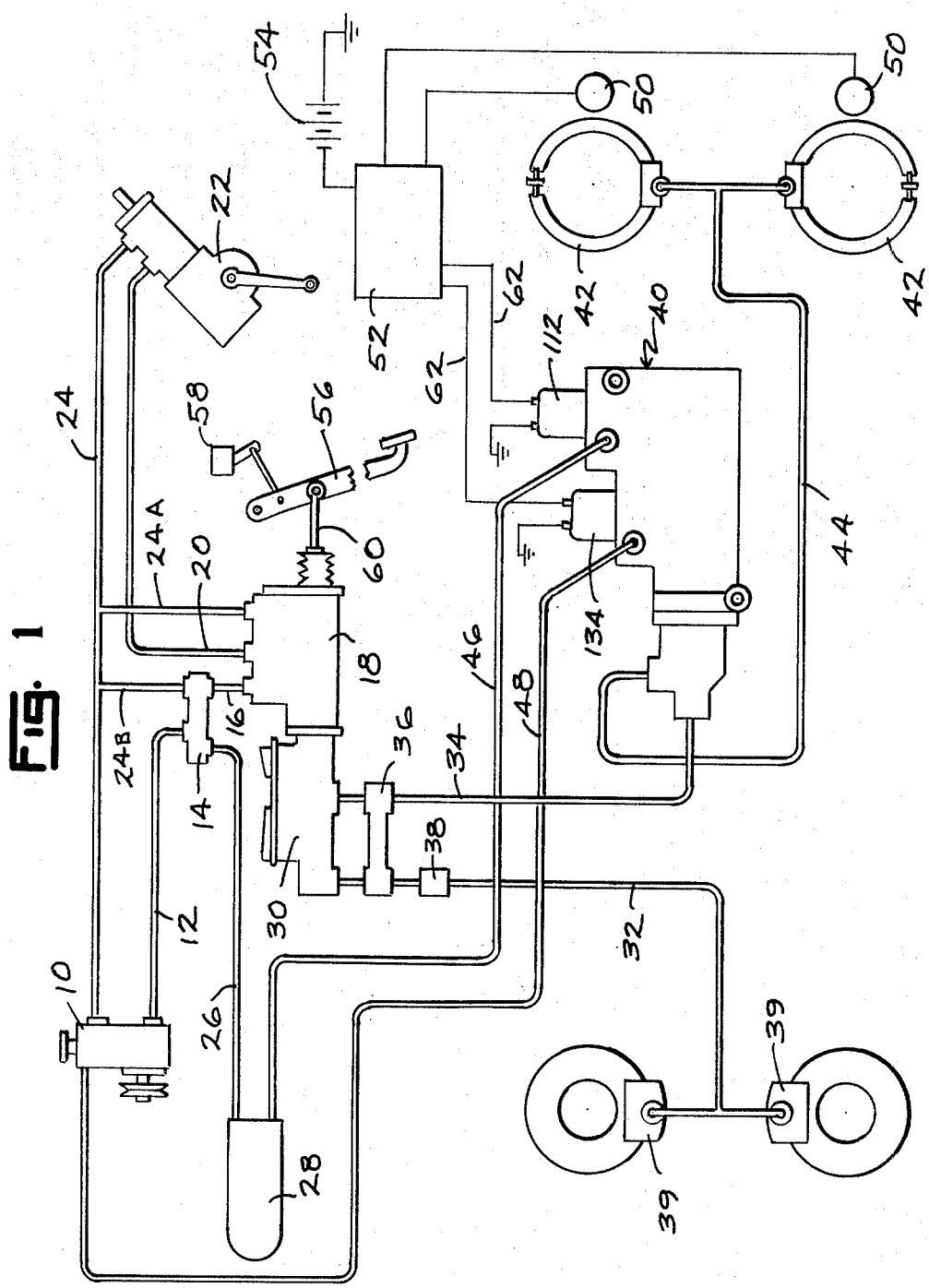
FIG. 1 is a diagrammatic view of a vehicle hydraulic braking and steering system including an adaptive braking system equipped with a hydraulic modulator.

Referring now to the drawings, the system of FIG. 1 is operated with fluid flow and pressure from a pump 10 which is belt driven from the vehicle engine (not shown). The fluid delivered by the pump 10 passes through a fluid conduit 12 to a conventional accumulator charging valve 14. The fluid leaves the charging valve 14 through a conduit 16 and enters the power brake booster 18. From the brake booster 18 the fluid passes through a conduit 20 and enters the control valve of the steering gear 22. The fluid is returned from the steering gear 22 to the reservoir of the pump through a return conduit 24. Branches of the return conduit 24A and 24B receive return fluid from the brake booster 18 and the accumulator charging valve 14 and join with the conduit 24 to return the fluid to the pump reservoir. In the manner well known in the art, the accumulator charging valve 14, when required, delivers pressurized fluid through a conduit 26 to an accumulator 28 so that the pressure in the accumulator 28 is maintained somewhere between suitable predetermined limits; for example, as maximum of 1,000 psi and a minimum of 800 psi. The brake booster 18 operates a conventional split master cylinder 30 which delivers fluid through front brake connections 32 and rear brake connections 34 which are connected to a suitable warning switch 36 and a metering valve 38 which function in a manner well known to the art. The front brake connection 32 leads directly to a pair of disc front brakes 39. A hydraulic modulator 40 receives brake system fluid from the conduit 34 and delivers it to a pair of rear drum brakes 42 through a conduit 44. The hydraulic modulator 40 receives high pressure hydraulic fluid from the accumulator 28 through a conduit 46 and returns the fluid to the reservoir of the pump 10 through a conduit 48.

Each of the rear wheels of the vehicle is provided with an electrical speed sensor 50. These sensors transmit signals relative to the speed of the wheels to an adaptive braking system amplifier 52. The amplifier 52 is supplied with electrical power from the vehicle battery 54. At the time that the brakes are applied by operation of the brake pedal 56, the amplifier 52 is energized by operation of a brake pedal switch 58. The pedal 56 is operatively connected to the brake booster 18 by means of a link 60. A pair of electrical circuits 62 connect the adaptive braking amplifier 52 to the solenoid valves which form parts of the modulator 40 and which will be more fully described later. In general, however, electrical signals are provided to the hydraulic modulator 40 which result in reducing or increasing the braking pressure transmitted to the rear wheel brake 42 through the conduit 44. More specifically, control signals will be generated by the adaptive braking amplifier 52 in response to signals received from the wheel speed sensors 50 combined with the application of logic within the amplifier 52 in a manner which does not form a part of this invention and which, therefore, will not be described in detail. For purposes of reference, the logic and amplifier circuitry could be of the type described and illustrated in U. S. application Ser. No. 673,651, having in common with this application the same assignee.

Reference is now made to FIG. 2, which shows in a longitudinal sectional view, a portion of the hydraulic modulator designated generally by the numeral 40. It consists of two cast housings bolted together. The housing 66 may be called the brake system housing. It is formed with two bosses containing ports receiving the conduits 34 and 44. It contains a brake modulating piston 68 in a bore 70 and a check valve 72 positioned to prevent passage of fluid from the conduit 34 to the conduit 44 without effecting flow in the opposite direction. When the modulating piston 68 is in its normal inoperative position, to the left as shown in FIG. 2, it engages the check valve 72 to hold it open permitting free passage of brake fluid between the conduits in either direction. The modulating piston 68 is sealed against external leakage by the usual seals 74.

The housing 76 may be called the power system housing. It is provided with a stepped bore having a large diameter portion 78 and a smaller diameter section 80 adjacent to the brake system housing. A double diameter power piston 82 is fitted into the stepped bore with its smaller end engaging the modulating piston 82. The right hand end of the large bore is closed by a plug 84 which forms a cavity 86 between it and the power piston 82. A group of springs 88, which may be replaced with one large spring, are compressed between the plug 84 and the power piston 82 to urge the piston towards its normally inoperative position in contact with the modulating piston 68, as shown in FIG. 2. It will be observed that an annular chamber 90 is created by the steps in the piston 82 and the large diameter portion 78 and the small diameter portion 80. The smaller end of the power piston 82 is provided with an annular groove 92 between spaced seals 94. A radial hole 96 connects the groove 92 with a central bore 98 in the power piston 82. A check valve 100 is positioned in the bore 98 with its stem engaging the modulating piston 68 and 102, whereby the check valve 100 is held open permitting free passage from the annular groove 92, through the radial hole 96 and the central bore 98 to the cavity 86. The stem of the check valve is sealed by a seal 104 and it is urged toward a closed position by a spring 106.

The conduit 46 from the accumulator 28 enters a port 108 leading to a passage 110 which extends from the annular cavity 90 to a solenoid valve 112 which is known as the "build" valve. The valve 112 has an armature 114 carrying a valve ball 116 which normally rests on a valve seat 118. A coil 120, when energized, can lift the ball 116 from the seat 118 and admit fluid from the accumulator 28 through a passage 122 containing a check valve 124, leading to the chamber 86. The check valve 124 is normally held closed by a spring 126, and functions to prevent reverse flow of hydraulic fluid from cavity 86 to the accumulator 28 at such times as the accumulator 28 may not contain pressure. The solenoid valve 112 has a highly restricted fluid passage or orifice 128 drilled through the valve seat structure, which bypasses the valve and permits a continuous, but highly restricted, flow from the accumulator to the chamber 86. This orifice provides the "slow build" operation of the adaptive braking cycle which was referred to above. The conduit 148 from the reservoir of the pump 10 enters a port 130 from which a passage 132 leads to another solenoid valve 134 which may be called the "decay" valve. This valve also has an armature 136 carrying a valve ball 138 which normally rests on a seat 140. A coil 142 can lift the ball 138 from the seat 140 and permit the escape of fluid from the cavity 86 through a passage 144 communicating with the annular groove 92. Because the solenoid valve 134 opens in the direction of flow and because the fluid pressure in the chamber 86 may at times equal the maximum accumulator pressure, the armature 136 is provided with a strong spring 146 which holds the ball 138 on its seat 140 with a force sufficient to resist a pressure somewhat higher that the maximum accumulator pressure. By this arrangement, the valve 134 performs a dual function, the additional function being to relieve excessive pressure which might otherwise develop in cavity 86 due to thermal expansion of the trapped fluid.

If it is assumed that the vehicle is in motion on a highway, the operation of the system is as follows. The accumulator 28 will contain hydraulic fluid pressure between the described limits and fluid from the pump will be flowing through the accumulator charging valve 14, the brake booster 18, and the steering valve 22 so that these devices will function in the normal manner. If the driver applies the brakes by exerting force on the pedal 56, fluid pressure will be raised in the lines 12 and 16 and the booster 18 will actuate the master cylinder 30 to discharge fluid to the brake lines 32 and 34 connected to the brakes 39 and 42. Pressure from the accumulator 28 enters the modulator 40 from the conduit 46 through the port 108 and is conducted by a passage 110 to the chamber 90 and also the inlet or "build" solenoid valve 112. The fluid passes through the "slow build" orifice 128 and the check valve 124 into the chamber 86. The pressure in the chamber 86 acts upon the large diameter portion of the power piston 82 while the pressure in the chamber 90 acts only on the annulus formed by the step. Therefore, a substantial force urges the piston 82 to the left, holding it in contact with the modulating piston 68 which, in turn, contacts the check valve 72 and holds it off its seat. This force is also supplemented by the force of the springs 88. When the brakes are applied, fluid from the master cylinder 30 is transmitted to the rear brakes 42 trough the conduit 34 passed the check valve 72 and thence through the conduit 44.

If maximum braking has been demanded by the application of sufficiently high foot pressure on the pedal 56 and the brakes approach a locked condition, the sensors 50 will signal the amplifier 52 and it will apply operating voltage to the outlet control means, the solenoid valve 134, causing it to lift the ball 138 from its seat 140, so that fluid can escape from the chamber 86 through the passages 98, 96, 144 and 132. With the release of fluid from the chamber 86, fluid from the accumulator 28 will flow into the chamber 90 forcing the power piston to the right and permitting the brake pressure in the bore 70 to move the modulating piston 68 to the right also. Initial movement of the modulating piston 68 permits the check valve 72 to close preventing further entrance of brake fluid into the bore 70. Continued rightward movement of the piston expands the volume of the chamber in the bore 70 permitting fluid to flow from the rear brake cylinders reducing the pressure and partially releasing the brakes 42. This permits the wheels to re-accelerate to a condition at which the amplifier will signal, by removing the operating voltage from the coil 142 of the solenoid valve 134, that further reductions in braking are no longer necessary. The valve ball 138 will be returned to its seat 140 and further rightward motion of power piston 82 and modulating piston 68 will cease. At this point, accumulator pressure will continue to flow into the chamber 86 through the "slow build" orifice 128 and the power piston 86 will start to move slowly towards the left producing a slow increase or "build" in braking pressure. When re-acceleration of the wheel has been completed, another signal from the amplifier 52 may indicate a need for a rapid increase in braking pressure by applying operating voltage to the inlet control means, the solenoid valve 112, causing the ball 116 to be lifted from its seat 118 so that a much more rapid flow of fluid from the accumulator 28 enters the chamber 86. The adaptive braking system is designed to continue to cycle substantially in the manner described so as to continually cause the modulator 40 to either increase or decrease the pressure in the rear brake wheel cylinders as long as the vehicle continues to move and the brakes 42 are applied hard enough to produce a high level of slip.

It will be observed that, as long as the operation proceeds as described above, the novel check valve 100 performs no function. However, there are occasions when the system does not work in this ideal manner. This is particularly true when the road surface is very slippery and high wheel slips are produced by very low brake pressures. Under these conditions the modulating piston 68 may not have to move very far to reduce the brake pressure practically to zero. Also, since the movement of this piston is caused solely by pressure in the chamber in the bore 70, and under the conditions described above, this pressure is very low. The modulating piston will tend to lag and the power piston 82 will move away from it. It is obvious that, if a fairly large clearance is established between the two pistons, the entire slow build period may elapse before contact is re-established. In fact, this may occur only after the amplifier 52 has called for "high build" by opening the solenoid 112. As explained before, such faulty operation might temporarily eliminate all of the possible advantages of an adaptive braking system. With the novel check valve 100 installed in the piston 82, the projecting end 102 of the valve stem acts as a sensing means and only a very slight separation of the two pistons 68 and 82 is permitted before the check valve closes preventing further flow of fluid through the passage 98 from the chamber 86 and locking the power piston 82 against further rightward movement. The check valve 72, in effect, acts as a means for overruling the control means, i.e. the outlet solenoid valve 134, at such times as the sensing means determines that the pistons 68 and 82 are not in contact. The fluid flow through the "low build" orifice 128 will immediately start movement of the power piston 82 to the left until the check valve 100 is held open sufficiently to permit an equal flow into the hole 96 and on through the outlet solenoid valve 134 as long as that solenoid is energized. Immediately after the solenoid 134 closes, the "slow build" flow will start moving the piston 82 at the usual rate and it only has to move far enough to fully open the check valve 100 before corresponding movement of the modulating piston 68 is established. The movement of the modulating piston 82 creates the desired increase in braking pressure. By careful design, the required movement of the check valve 100 can be reduced to a dimension measured in thousandths of an inch. From the foregoing, it will be seen that the invention provides novel means for preventing separation of the unconnected pistons by more than a predetermined distance.

While the invention has been illustrated and described in the context of a simple system having only one modulator controlling only the rear brakes of a vehicle, it should be understood that it is equally applicable to more complex systems having a number of modulators controlling a number of brakes or sets of brakes.

I claim:

1. In a vehicle adaptive braking system, a brake pressure modulator including:
   a housing having an inlet and outlet passage and a fluid chamber;
   a modulating piston for varying the pressure to said adaptive braking system;
   a power piston normally in abutting contact with said modulating piston, said power piston forming one wall of said fluid chamber;
   first valve means for controlling fluid flow in said inlet passage to said fluid chamber;
   means for bypassing said first valve means;
   second valve means for controlling fluid flow in said outlet passage to said fluid chamber;
   said pistons being constructed and arranged so that brake system pressure normally holds them in contact and fluid flow in the inlet passage causes piston movement resulting in an increase in brake pressure, and fluid flow in the outlet passage causes piston movement resulting in a decrease in brake pressure;
   said power piston characterized by having part of the outlet passage formed therein and a check valve positioned in said part of the outlet passage to close said check valve against outlet flow, said check valve having a projection through the end of said power piston into contact with the modulating piston to prevent separation of said power piston and modulating piston by more than a predetermined distance to prevent overreaction caused by large separations.

* * * * *